United States Patent
Majumdar et al.

(10) Patent No.: US 12,392,616 B2
(45) Date of Patent: Aug. 19, 2025

(54) METHOD AND APPARATUS TO DETERMINE LOCATION FOR AN UNMANNED AERIAL VEHICLE (UAV)

(71) Applicant: Samsung Electronics Co., Ltd., Suwon-si (KR)

(72) Inventors: Chitradeep Majumdar, Bangalore (IN); Neha Sharma, Bangalore (IN); Diwakar Sharma, Bangalore (IN); Anshuman Nigam, Bangalore (IN); Vikalp Mandawaria, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 17/817,311

(22) Filed: Aug. 3, 2022

(65) Prior Publication Data

US 2023/0054538 A1    Feb. 23, 2023

Related U.S. Application Data

(63) Continuation of application No. PCT/KR2022/011430, filed on Aug. 2, 2022.

(30) Foreign Application Priority Data

Aug. 3, 2021  (IN) .............................. 202141034965
Jul. 27, 2022 (IN) ............................. 202141034965

(51) Int. Cl.
  *G01C 21/20* (2006.01)
  *H04B 7/185* (2006.01)
  (Continued)

(52) U.S. Cl.
  CPC ......... *G01C 21/20* (2013.01); *H04B 7/18504* (2013.01); *H04W 16/28* (2013.01); *H04W 64/003* (2013.01)

(58) Field of Classification Search
  None
  See application file for complete search history.

(56) References Cited

U.S. PATENT DOCUMENTS 9,853,713 B2    12/2017  Jalali
9,866,313 B1    1/2018   Murphy
(Continued)

FOREIGN PATENT DOCUMENTS

CN    110087189 A  *  8/2019  ......... H04B 7/18504
CN    112822745 A     5/2021
(Continued)

OTHER PUBLICATIONS

Translation of CN110087189 (Year: 2019).*
(Continued)

*Primary Examiner* — German Viana Di Prisco

(57) ABSTRACT

The present subject matter refers methods and systems to determine location for an unmanned aerial vehicle (UAV). The method comprises receiving information from a network entity, the information indicating that the plurality of terrestrial UEs form a cluster, determining whether at least one of a plurality of predefined events is triggered. The method comprises determining the location of the UAV by: receiving cluster information related to the cluster, determining circular trajectory of the cluster using the cluster information, receiving a first average data rate of the cluster at each of a plurality of locations along a circumference of the circular trajectory, determining an optimal down-tilt angle and an optimal bearing angle of an antenna panel of the UAV, and determining the location of the UAV based on the optimal down-tilt angle and the optimal bearing angle.

16 Claims, 6 Drawing Sheets

(51) Int. Cl.
*H04W 16/28* (2009.01)
*H04W 64/00* (2009.01)

(56) References Cited

U.S. PATENT DOCUMENTS

| | | | |
|---|---|---|---|
| 10,312,993 | B2 | 6/2019 | Rupasinghe et al. |
| 2010/0087198 | A1* | 4/2010 | Wigren ............... G01S 5/02525 |
| | | | 455/446 |
| 2015/0237569 | A1 | 8/2015 | Jalali |
| 2016/0088498 | A1 | 3/2016 | Sharawi |
| 2020/0260404 | A1* | 8/2020 | Vrind .................. H04W 64/003 |

FOREIGN PATENT DOCUMENTS

| | | |
|---|---|---|
| KR | 10-2009608 B1 | 8/2019 |
| WO | 2016012055 A1 | 1/2016 |
| WO | 2017019595 A1 | 2/2017 |
| WO | 2018112091 A1 | 6/2018 |
| WO | WO-2021102796 A1 * | 6/2021 |

OTHER PUBLICATIONS

International Search Report and Written Opinion of the International Searching Authority dated Oct. 28, 2022, in connection with International Application No. PCT/KR2022/011430, 9 pages.
Kalwar, "Throughput Maximization in Unmanned Aerial Vehicle Networks," University of Wollongong Thesis Collections, Feb. 2020, 172 pages.
Oh, "Communications-Aware Multi-Target Tracking Guidance for Cooperative UAVs with Gimbaled Vision Sensors in Urban Environments," Ulsan National Institute of Science and Technology Thesis, ScholarWorks, UNIST, Feb. 2021, 56 pages.
Rysdyk, "UAV Path Following for Constant Line-of-Sight," American Institute of Aeronautics and Astronautics, Jun. 2012, 11 pages.
Supplementary European Search Report dated Nov. 18, 2024, in connection with European Application No. 22853443.4, 8 pages.
Lai, et al., "Data-Driven 3D Placement of UAV Base Stations for Arbitrarily Distributed Crowds," 2019 IEEE Global Communications Conference (Globecom), IEEE, Dec. 2019, 6 pages.
Examination report dated Jun. 19, 2025, in connection with Indian Application No. 202141034965, 7 pages.

* cited by examiner

METHOD AND APPARATUS TO DETERMINE LOCATION FOR AN UNMANNED AERIAL VEHICLE (UAV)

CROSS-REFERENCE TO RELATED APPLICATIONS

This application is a continuation of International Application No. PCT/KR2022/011430, filed on Aug. 2, 2022, in the Korean Intellectual Property Receiving Office and claiming priority to Indian Provisional patent application number 202141034965, filed on Aug. 3, 2021, in the Indian Patent Office, and to Indian Complete patent application number 202141034965, filed on Jul. 27, 2022, in the Indian Patent Office, the disclosures of each of which are incorporated by reference herein in their entireties.

BACKGROUND

1. Field

The present disclosure generally relates to wireless communication and particularly relates to a method and apparatus to determine location for an unmanned aerial vehicle (UAV).

2. Description of Related Art

Airborne networks foster the roll out of 5G service in un-served areas (such as isolated/remote areas, on board aircrafts or vessels) that cannot be covered by terrestrial MG network and underserved areas (such as sub-urban/rural areas) to upgrade performance of limited terrestrial networks in cost effective manner. The airborne networks impact coverage, user bandwidth, system capacity, service reliability or service availability, energy consumption, connection density. However, in the airborne network, an unmanned aerial vehicle (UAV) when acting as base station, relays or transmission/reception points (TRPs) or any other network entity has certain technical challenges like:

determination of optimal 3-D location or optimal trajectory (if the UAV is mobile) of the UAV that would enhance the overall sum-rate of the served terrestrial users. determining optimal 3-D location on-the-fly periodically either by the UAV or network is computationally intensive task. determination of optimal 3-D location by the UAV autonomously is even more non-trivial due to the inherent challenges like limited power availability, limited operational time.

Further, optimal 3-D locations for the UAVs in semi-static dynamically changes. For static enhanced mobile broadband (eMBB) terrestrial users (such as indoor data streaming through laptop) though this change is not very rapid but for other mobile broadband applications (such as cell phone streaming applications), optimal 3-D location of UAV can change very frequently. However, on-the-fly complicated optimization algorithms is difficult to implement and is typically highly computationally intensive. Also, a generic framework to determine the optimal 3-D location of the UAV leads to poor sub-optimal determination of the location.

Further, periodic determination of optimal 3-D location is essential because the network condition on the ground is highly dynamic (such as user equipment (UEs) with mobility, dynamically changing number of UEs with time, dynamic data-traffic requirement of the UEs).

Hence, there is need to for techniques to efficiently compute optimal location of the UAV periodically.

SUMMARY

This summary is provided to introduce a selection of concepts in a simplified format that are further described in the detailed description of this disclosure. This summary is not intended to identify key or essential concepts of the disclosure, nor is it intended for determining the scope of the disclosure.

In an embodiment, a method to determine location for an unmanned aerial vehicle (UAV) serving a plurality of terrestrial user equipment (UEs) is provided. The method comprises receiving information from a network entity, the information indicating that the plurality of terrestrial UEs form a cluster. The method further comprises determining whether at least one of a plurality of predefined events is triggered. The method also comprises determining the location of the UAV, in case that the plurality of terrestrial UEs form the cluster and if the at least one of the plurality of predefined events is triggered, wherein determining the location comprises: receiving cluster information related to the cluster, determining circular trajectory of the cluster using the cluster information, receiving a first average data rate of the cluster at each of a plurality of locations along a circumference of the circular trajectory, determining an optimal down-tilt angle ($\theta$) and an optimal bearing angle ($\Phi$) of an antenna panel of the UAV based on the first average data rate at each of the plurality of locations, and determining the location of the UAV based on the optimal down-tilt angle ($\theta$) and the optimal bearing angle ($\Phi$).

In another embodiment, a method to determine location for an UAV serving a plurality of terrestrial UEs is provided. The method comprises determining that the plurality of terrestrial UEs are uniformly distributed in a cell, receiving location coordinates of the plurality of terrestrial UEs, determining a plurality of location parameters of the UAV using the location coordinates of the plurality of terrestrial UEs, wherein the plurality of location parameters includes at least one of a 3-D ground distance of the UAV (R), a 3-D polar angle the UAV makes with the positive x-axis passing through a center of the cell which is considered at origin ($\emptyset$) and a height of the UAV ($h_{UAV}$), and transmitting the plurality of location parameters to the UAV.

In another embodiment, a system (or an apparatus) for determining a location for an UAV serving a plurality of terrestrial UEs, is disclosed. The system (or the apparatus) comprises a transceiver and a processor. The processor is configured to: receive, via the transceiver, information from a network entity, the information indicating that the plurality of terrestrial UEs form a cluster, determine whether at least one of a plurality of predefined events is triggered, determine the location of the UAV, in case that the plurality of terrestrial UEs form the cluster and the at least one of the plurality of predefined events is triggered, wherein determining the location comprises: receiving cluster information related to the cluster, determining circular trajectory of the cluster using the cluster information, receiving a first average data rate of the cluster at a plurality of locations along the circular trajectory; determining an optimal down-tilt angle ($\theta$) and an optimal bearing angle ($\Phi$) of an antenna panel of the UAV at the plurality of locations, and determine the location of the UAV based on the optimal down-tilt angle ($\theta$) and the optimal bearing angle ($\Phi$).

In yet another embodiment, a system (or an apparatus) for determining a location for an UAV serving a plurality of terrestrial UEs, is disclosed. The system (or the apparatus) comprises a transceiver and a processor. The processor is configured to: determine that the plurality of terrestrial UEs are uniformly distributed in a cell, receive, via the transceiver, location coordinates of the plurality of terrestrial UEs, determine a plurality of location parameters of the UAV using the location coordinates of the plurality of terrestrial UEs, wherein the plurality of location parameters includes at least one of a 3-D ground distance of the UAV (R), a 3-D polar angle the UAV makes with the positive x-axis passing through a center of the cell which is considered at origin (Ø) and a height of the UAV ($h_{UAV}$), and transmit the plurality of location parameters to the UAV.

To further clarify the advantages and features of the present disclosure, a more particular description of the disclosure will be rendered by reference to specific embodiments thereof, which is illustrated in the appended drawing. It is appreciated that these drawings depict typical embodiments of the disclosure and are therefore not to be considered limiting its scope. The disclosure is described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
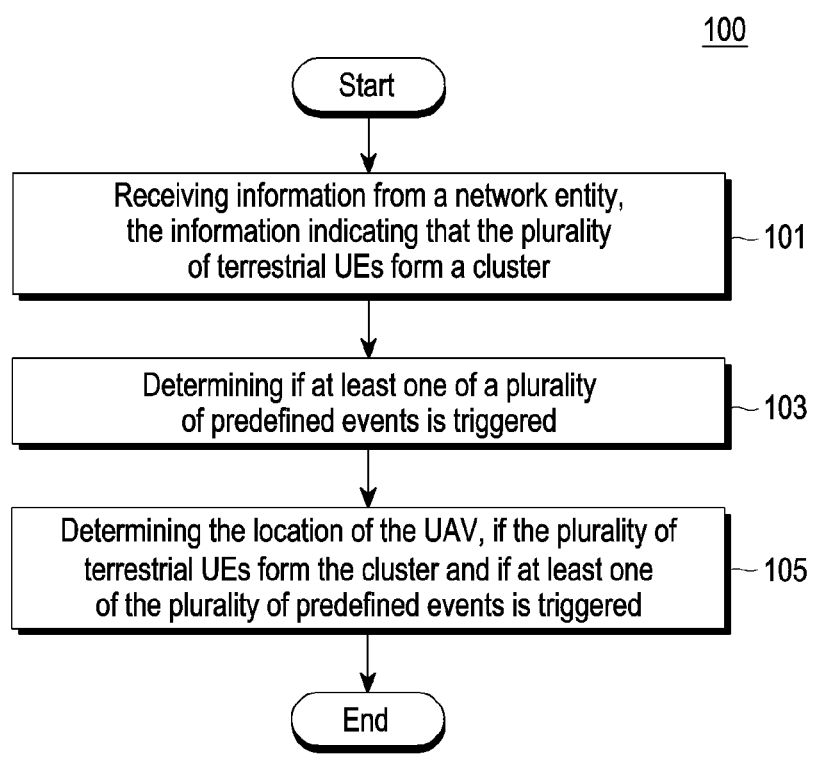
FIG. 1 illustrates a flow diagram depicting a method to determine location for an unmanned aerial vehicle (UAV) serving a plurality of terrestrial user equipments (UEs), in accordance with an embodiment of the present disclosure.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It should be noted that the terms "user equipment," "UE," and "terrestrial UE" have been used interchangeably throughout the specification.

The present disclosure generally relates to techniques to determine an optimal 3-D location or trajectory of the unmanned aerial vehicle (UAV) acting as a base station in higher wireless communication network such as 5th generation (5G)/beyond 5G (B 5G) gNB. The optimal 3-D location or trajectory can be based on feedback from a network entity, a UE or both. Placement of the UAV at the determined optimal 3-D location maximized overall sum-rate of the terrestrial user equipment (UEs) served by the UAV gNB. In certain embodiments, the UAV may determine its 3-D location, if a plurality of UEs served by the UAV form a cluster. In another embodiment, a network entity with which the UAV is connected to may determine 3-D location of the UAV, if the plurality of UEs served by the UAV are uniformly distributed in a cell. It should be noted that the cell may refer to a geographical area served by the network entity. The network entity may refer to a base station of the wireless communication network such as MG/B MG gNB (or the base station).

Embodiments of the present disclosure will be described below in detail with reference to the accompanying drawings.

Figure 2:
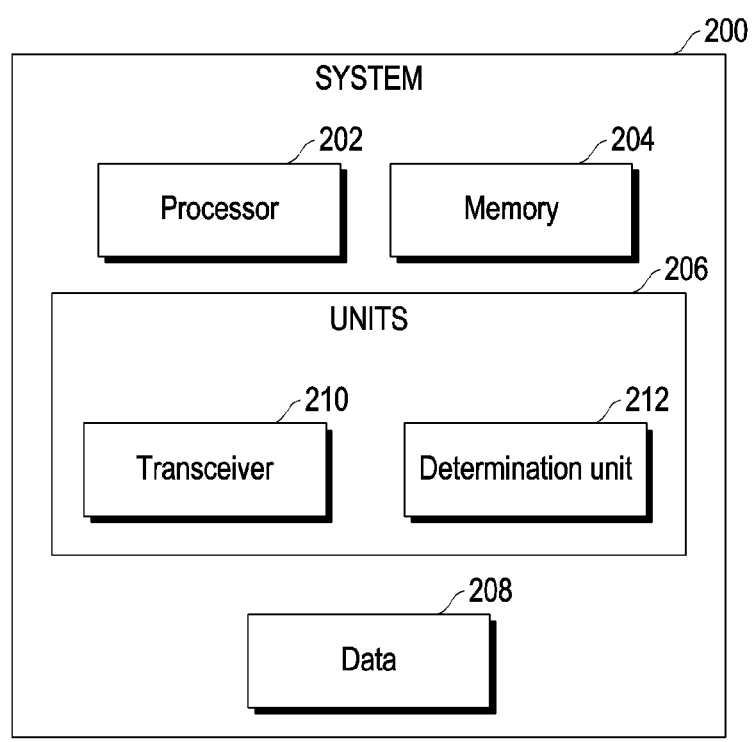
FIG. 2 illustrates a block diagram of a system to determine location for an UAV serving a plurality of terrestrial UEs, in accordance with an embodiment of the present disclosure.

FIG. 1 illustrates a flow diagram depicting a method 100 to determine location for an UAV serving a plurality of terrestrial UEs, in accordance with a first embodiment of the present disclosure. FIG. 2 illustrates a block diagram of a system (or an apparatus) 200 to determine location for an UAV serving a plurality of terrestrial UEs, in accordance with an embodiment of the present disclosure. For the sake of brevity, the description of the FIGS. 1 and 2 are explained in conjunction with each other.

The system (or the apparatus) 200 may include, but is not limited to, a processor 202, memory 204, units 206, and data unit 208. The units 206 and the memory 204 may be coupled to the processor 202.

The processor 202 can be a single processing unit or several units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 206 amongst other things, include routines, programs, objects, components, data structures, etc., which perform particular tasks or implement data types. The units 206 may also be implemented as, signal processor(s), state machine(s), logic circuitries, and/or any other device or component that manipulate signals based on operational instructions.

Further, the units 206 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the tasks or, the processing unit can be dedicated to performing the functions. In another embodiment of the present disclosure, the units 206 may be machine-readable instructions (software) which, when executed by a processor/processing unit, perform any of the described functionalities.

In certain embodiments, the units 206 may include a transceiver 210 and a determination unit 212. The various units 206 such as the transceiver 210 and the determination unit 212 may be in communication with each other. In certain embodiments, the various units 206 such as the transceiver 210 and the determination unit 212 may be a part of the processor 202. In another embodiment, the processor 202 may be configured to perform the functions of units 206 such as the transceiver 210 and the determination unit 212. The data unit 208 serves, amongst other things, as a repository for storing data processed, received, and generated by one or more of the units 206.

The system 200 may be a part of the UAV or may be connected to the UAV.

Referring to FIG. 1, at step 101, the method 100 may comprise receiving information from a network entity. the received information can indicate that the plurality of terrestrial UEs form a cluster. In particular, the network entity may determine that the plurality of terrestrial UEs forms the cluster and the transceiver 210 may receive this information from the network entity. In certain embodiments, the network entity may determine that the plurality of terrestrial UEs form the cluster of the as follows:

The terrestrial UEs can transmit sounding reference signals (SRS) with a certain periodicity through which the network entity can have a coarse estimation of the directionality of the UE (i.e., from which direction the sounding reference signals is received by the base station). There can be multiple UEs within the same directionality (same region of the cell).

Step-1: In order to be ascertain whether the UEs are clustered, the network entity transmits multiple synchronization signal block (SSB) beams for a predefined period such as 5 ms with a predefined periodicity such as 20 ms periodicity, as per 3GPP specification in downlink.

Step-2: Based on the information content of each of the SSB beams (RSRP/RSRQ), each UE determines the best beam which provides maximum signal-to-noise ratio (SNR) and sends beam measurement report to the network entity.

Step-3: The network entity estimates pathloss (PL) and distance for each of the UEs.

Step 4: If standard deviation of the PL<PL threshold (PL threshold) or large no. of UEs selected the same set of SSB beams, then the network entity determines that the plurality of UEs form the cluster. If not, then the network entity determines that the UEs are uniformly distributed in a cell. It should be noted that PL_threshold may be configured by the network entity.

It should be noted that the network entity may use any other know technique to determine if the plurality of UEs form the cluster.

If the plurality of UEs form the cluster, then at step 103, the method 100 may comprise determining if at least one of a plurality of predefined events is triggered. In certain embodiments, the determination unit 212 may determine that the at least one of the predefined events is triggered. In such embodiment, the plurality of predefined events may include change in parameters of the UAV such as change in number of UAVs, change in UAV residual power, change in line-of-sight or non-line-of-sight-probabilities of the UAV, and change of command and control link parameters. Further, the UAV may receive parameters to determine that the at least one predefined event has triggered, from the network entity through command and control signals. These command and control signals are dedicated control signals over highly stable links between the network entity and UAV that controls the physical operation of the UAV. In certain embodiments, the parameters may include reduction in average data-rate of the terrestrial UEs, reduction in packet error rate of the plurality of the terrestrial UEs, increase in average outage probability, change in number of the plurality of the terrestrial UEs, change in data traffic requirement of the plurality of the terrestrial UEs, change in interference level, change of command and control link parameters or UAV power status. For example, if there is increase in latency of transmitting/receiving data over the command and control link parameters, then it may be considered as change of command and control link parameters. In another example, average outage probability may be defined as the probability of a signal-to-interference-plus-noise ratio (SINR) of receiving data over the command and control link being less than or equal to a predefined SINR threshold. It should be noted that the predefined SINR threshold may defined by the network entity. In another embodiment, the network entity may determine that the at least one of the predefined events is triggered and the determination unit 212 may receive this information via the transceiver 210. In certain embodiments, the determination unit 212 may receive this information via the command and control signals. In such embodiment, the plurality of the predefined events may include reduction in average data-rate of the terrestrial UEs, reduction in packet error rate of the plurality of the terrestrial UEs, increase in average outage probability, change in number of the plurality of the terrestrial UEs, change in data traffic requirement of the plurality of the terrestrial UEs, change in interference level, change of command and control link parameters or UAV power status.

Figure 3:
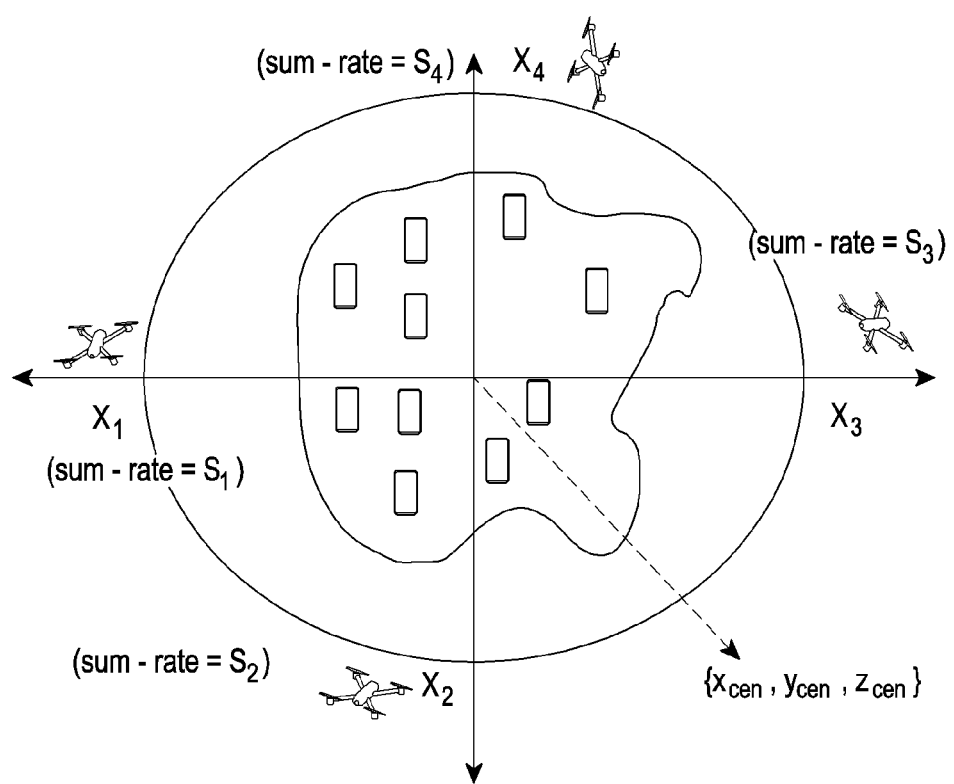
FIG. 3 illustrates an example of a cluster of UEs served by the UAV, in accordance with an embodiment of the present disclosure.

Referring back to steps 101 and 103, if it is determined that the plurality of terrestrial UEs form the cluster and the at least one of the plurality of predefined events is triggered, then, at step 105, the method 100 may comprise determining the location of the UAV. In order to determine the location of the UAV, the determination unit 212 via the transceiver 210 may receive cluster information related to the cluster. FIG. 3 shows an example of a cluster of UEs served by the UAV, in accordance with an embodiment of the present disclosure. In an exemplary embodiment, the cluster information may include a centroid of a circle 303 of the cluster 301 and a radius of the circle 303. In certain embodiments, the network entity may obtain location cartesian coordinates of the UEs and uses a K-means clustering method to determine the cluster information. It should be noted that the network entity may use any other known technique to determine the cluster information. As shown in FIG. 3, in an exemplary embodiment, coordinates of centroid of the cluster are $x_{cen}, y_{cen}, z_{cen}$.

In certain embodiments, the determination unit 212 may receive the cluster information from the network entity. This may be known as network entity assisted approach. In this approach, the network entity (i) acquires the location of all the UEs, (ii) does the clustering, and (iii) transmits the information parameters to the UAV for 3-D location. The network entity approach may be used if direct reliable links between the network entity and the UEs are available, i.e., peak error rate (PER) is less than or equal to a threshold PER (PERth) and if additional information such as channel state information (CSI), beam parameters of the UEs, interference experienced by the UEs are not available. It should be noted that the threshold PER may defined by the network entity.

In another embodiment, the determination unit 212 may receive the cluster information from the plurality of the terrestrial UEs. This may be known as UE assisted approach. In this approach, the network entity transfers the task of UEs clustering and information parameters sharing directly to the UEs instead of a centralized control. The UEs then form the cluster and share relevant information directly with the UAV through physical uplink control channel (PUCCH). The UE assisted approach may be used if the UEs are located at remote location and the network entity finds that direct reliable links with the UEs are unavailable, i.e., peak error rate (PER) is greater than a threshold PER (PERth).

In another embodiment, the determination unit 212 may receive the cluster information from the network entity, wherein the network entity determines the cluster information based on at least one of a CSI, beam parameters of the plurality of terrestrial UEs, interference experienced by the plurality of terrestrial UEs, and minimum packet error rate (PER) threshold data traffic requirement of the plurality of the terrestrial UEs. This may be known as network entity and UE assisted approach. In this approach, the network entity acquires additional information from the UEs other than their location information that might include CSI, beam parameters of the UEs, interference experienced by the UEs, minimum packet error rate (PER) threshold data traffic requirement etc. The network entity then transmits these relevant information parameters to the UAV. The network entity and UE assisted approach may be used if direct reliable links between the network entity and the UEs are available, i.e., peak error rate (PER) is less than or equal to a threshold PER (PERth) and if additional information such as CSI, beam parameters of the UEs, interference experienced by the UEs are available.

After receiving the cluster information, the determination unit 212 may determine a circular trajectory of the cluster using the cluster information. In an example, radius of the circular trajectory (R) may be determined as below: Radius of circular trajectory (R)=Mean of UE distances from centroid+2 x standard deviation of UE distances from centroid Thereafter, the determination unit 212 receives a first average data rate of the cluster at each of a plurality of locations along a circumference of the circular trajectory. For example, the determination unit 212 may locate 4 diametrically opposite locations {x1, x2, x3, x4} randomly along the circular trajectory (along circumference of the circular trajectory which covers a circular area around the cluster 301. Then, the first average data rate may be determined at each of these locations as below:

$$\text{avg. data rate} = \frac{1}{N_{UE}} \sum_{i=1}^{N_{UE}} B \log_2 \{1 + SINR_i(\theta_{down-tilt}, \varphi_{bearing})\} \quad (1)$$

where N_UE is number of UEs in the cluster 301, down-tilt angle (θ) and an optimal bearing angle (Φ) are optimal down-tilt and bearing angles, B is bandwidth of communication channel sued by the UE.

Thereafter, the determination unit 212 may determine an optimal down-tilt angle (θ) and an optimal bearing angle (Φ) of an antenna panel of the UAV based on the first average data rate at each of the plurality of locations. In certain embodiments, to determine the optimal down-tilt angle (θ) and an optimal bearing angle (Φ), the determination unit 212 may receive an average data rate at each of the plurality of locations corresponding to each of a plurality of down-tilt angles (θ) and each of a plurality of bearing angles (Φ) and determine the optimal down-tilt angle (θ) and the optimal bearing angle (Φ) from the plurality of down-tilt angles (θ) and bearing angles (Φ), at which the average data rate is equal to or greater than the first average data rate. For example, at each of the plurality of locations, i.e., {x1, x2, x3, x4}, the determination unit 212 determines average data rate of the cluster at bearing angle (Φ) and down-tilt angle (θ) ranging from 0 to 180 and 0 to −180. The determination unit 212 then determines the optimal down-tilt angle (θ) and the optimal bearing angle (Φ) from the plurality of down-tilt angles (θ) and bearing angles (Φ), at which the average data rate is equal to or greater than the first average data rate. For example, if the average data rate is equal to or greater than the first average data rate at a down-tilt angle (θ) of 40 degree and bearing angle (Φ) of 45 degree, then the optimal down-tilt angle (θ) is 40 degree and the optimal bearing angle (Φ) is 45 degrees.

Figure 4A:
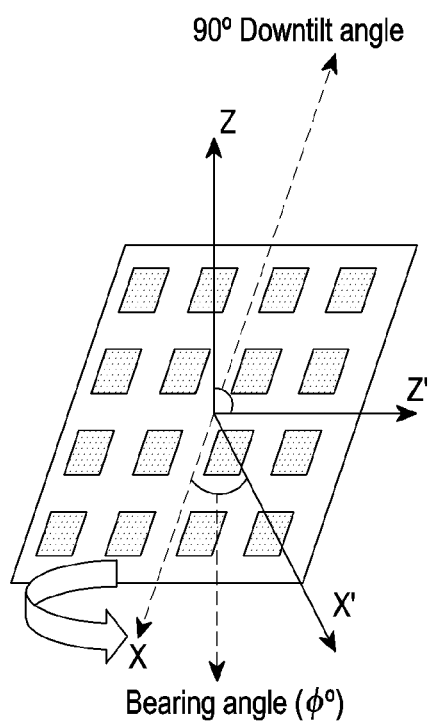
FIGS. 4A and 4B illustrate exemplary antenna panels of the UAV, in accordance with an embodiment of the present disclosure.
Figure 4B:
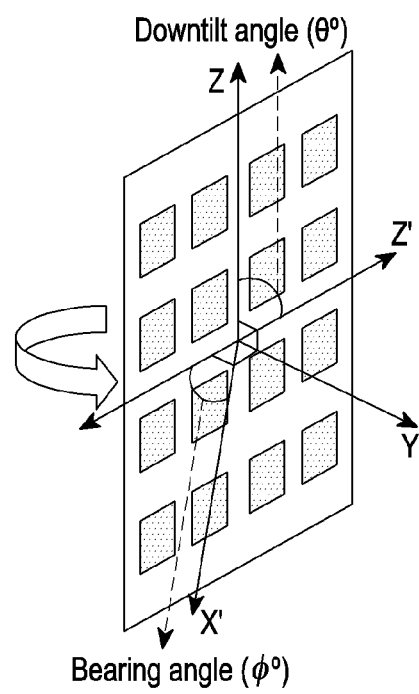

In certain embodiments, the UAV may have a fixed down tilted antenna panel with down-tilt angle (θ) of 90 degree (which implies the active antenna element faces ground), as shown in FIG. 4A. However, the bearing angle (Φ) of the antenna is flexible to rotate and the antenna bearing angle (Φ) is flexible to rotate 360 degrees (0 to 180 degree anti-clockwise, 0 to −180 degree clockwise). In another embodiment, the UAV may have flexible bearing and down-tilt antenna panel, as shown in FIG. 4B. The down-tilt angle (θ) may be flexible from 0 to 90 degree.

In certain embodiments, the determination unit 212 may use the following signaling in determining the optimal down-tilt angle (θ) and the optimal bearing angle (Φ):

1) The UAV orients its antenna panel to a random bearing angle;
2) The UAV adapts its down-tilt angle (θ) by a small margin (2.5 degree/5 degrees/10 degrees) till it reaches 90 degrees (down-tilted);
3) UAV transmits signaling message to all UEs through broadcast/unicast/multicast—request for current data rate (# RCDR);
4) UAV determines the periodicity of the SRS control signaling based on the frequency of #RCDR;
5) UEs transmit their current data rates served through the UAV via periodic SRS control messages;
6) Based on the UE response, the UAV determined the optimal down-tilt angle which would maximize sum-rate for all the UEs in the cluster for that bearing angle;
7) Repeat steps 3-6 to determine the optimal bearing angle that would maximize the average data-rate of all the UEs in the cluster at the down-tilt angle estimated in the previous steps
8) Repeat Step 1-7 iteratively till the estimated avg. data rate for the current pair of the bearing and down-tilt angle is equal to greater than the first average data rate.

Then, the determination unit 212 determines the location of the UAV based on the optimal down-tilt angle (θ) and the optimal bearing angle (Φ). In certain embodiments, the determination unit 212 determines the location of the UAV using known techniques to a person skilled in the art.

In a further embodiment, the determination unit 212 may determine if at least one of plurality of key performance indicators (KPI) of the plurality of terrestrial UEs is below a predetermined threshold. If a determination that least one of plurality of key performance indicators (KPI) of the plurality of terrestrial UEs is below a predetermined threshold, then the determination unit 212 may request the network entity to modify a plurality of parameters of the UAV. In certain embodiments, the KPI may include peak data rate, peak spectral efficiency, data rate experienced by user, area traffic capacity, latency connection density, average spectral efficiency, energy efficiency, reliability etc.

In certain embodiments, the method 100 may further comprise relocating the UAV to the determined location.

Figure 5:
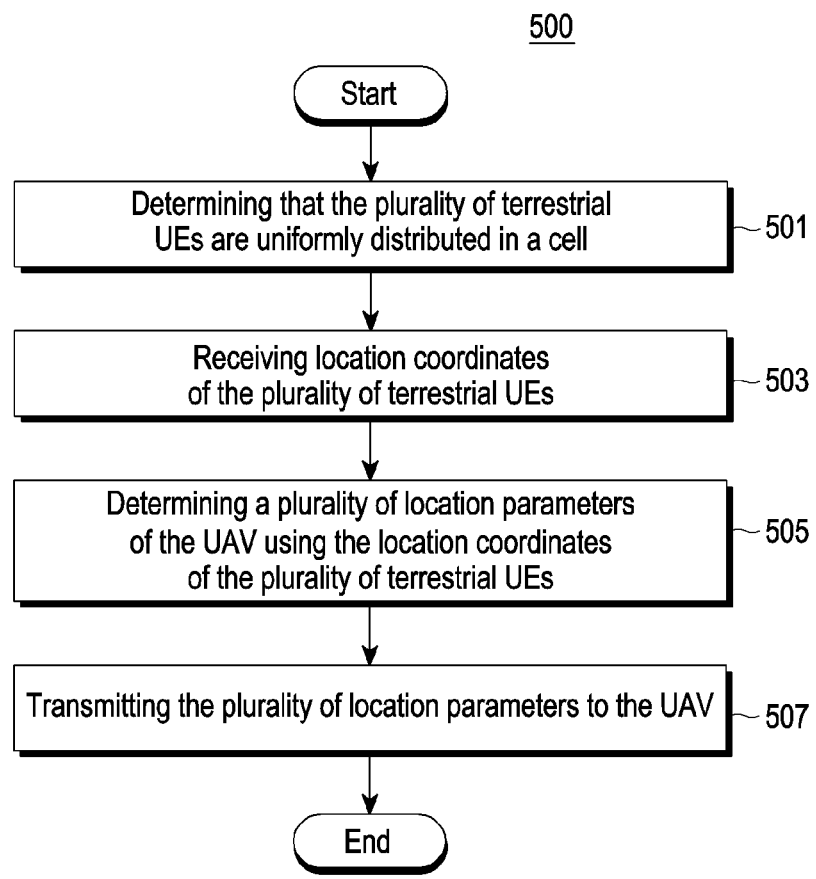
FIG. 5 illustrates a flow diagram depicting a method to determine location for an UAV serving a plurality of terrestrial UEs, in accordance with an embodiment of the present disclosure.
Figure 6:
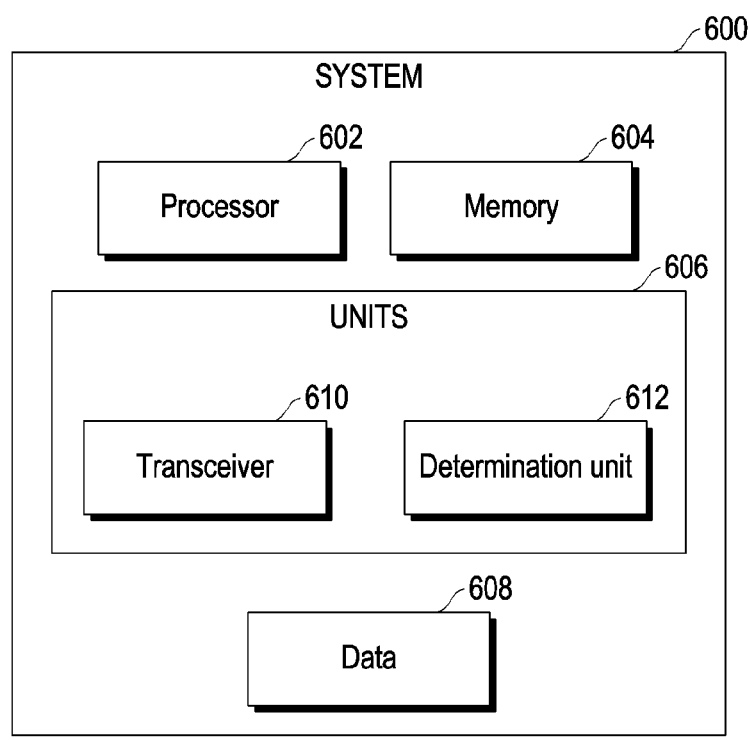
FIG. 6 illustrates a block diagram of a system to determine location for an UAV serving a plurality of terrestrial UEs, in accordance with an embodiment of the present disclosure.

FIG. 5 illustrates a flow diagram depicting a method to determine location for an UAV serving a plurality of terrestrial UEs, in accordance with a second embodiment of the present disclosure. FIG. 6 illustrates a block diagram of a system to determine location for an UAV serving a plurality of terrestrial UEs, in accordance with the second embodiment of the present disclosure. For the sake of brevity, the description of the FIGS. 5 and 6 are explained in conjunction with each other.

The system (or apparatus) 600 may include, but is not limited to, a processor 602, memory 604, units 606, and data unit 608. The units 606 and the memory 604 may be coupled to the processor 602.

The processor 602 can be a single processing unit or several units, all of which could include multiple computing units. The processor 602 may be implemented as one or more microprocessors, microcomputers, microcontrollers, digital signal processors, central processing units, state machines, logic circuitries, and/or any devices that manipulate signals based on operational instructions. Among other capabilities, the processor 602 is configured to fetch and execute computer-readable instructions and data stored in the memory 604.

The memory 604 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 606 amongst other things, include routines, programs, objects, components, data structures, etc., which perform particular tasks or implement data types. The units 606 may also be implemented as, signal processor(s), state machine(s), logic circuitries, and/or any other device or component that manipulate signals based on operational instructions.

Further, the units 606 can be implemented in hardware, instructions executed by a processing unit, or by a combination thereof. The processing unit can comprise a computer, a processor, such as the processor 602, a state machine, a logic array, or any other suitable devices capable of processing instructions. The processing unit can be a general-purpose processor which executes instructions to cause the general-purpose processor to perform the tasks or, the processing unit can be dedicated to performing the functions. In another embodiment of the present disclosure, the units 606 may be machine-readable instructions (software) which, when executed by a processor/processing unit, perform any of the described functionalities.

In certain embodiments, the units 606 may include a transceiver 610 and a determination unit 612. The various units 606 such as the transceiver 610 and the determination unit 612 may be in communication with each other. In embodiments, the various units 606 such as the transceiver 610 and the determination unit 612 may be a part of the processor 602. In another embodiment, the processor 602 may be configured to perform the functions of units 606 such as the transceiver 610 and the determination unit 612. The data unit 608 serves, amongst other things, as a repository for storing data processed, received, and generated by one or more of the units 606.

The system 600 may be a part of the network entity or may be connected to the network entity.

Referring back to FIG. 5, at step 501, the method 500 may comprise determining that the plurality of terrestrial UEs are uniformly distributed in a cell. In an exemplary embodiment, the determination unit 612 may determine that the plurality of terrestrial UEs are uniformly distributed in a cell, in a similar fashion as explained in reference to step 101 of FIG. 1.

Then, at step 503, the method 500 may comprise receiving location coordinates of the plurality of terrestrial UEs. In certain embodiments, the transceiver 610 may receive the location coordinates of the plurality of terrestrial UEs using techniques known to a person skilled in the art.

Then, at step 505, the method 500 may comprise determining a plurality of location parameters of the UAV using the location coordinates of the plurality of terrestrial UEs. In certain embodiments, the plurality of location parameters includes at least one of a 2-D ground distance of the UAV (R), a 2-D polar angle the UAV makes with the positive x-axis passing through a center of the cell which is considered at origin (Ø) and a height of the UAV ($h_{UAV}$). In certain embodiments, the determination unit 612 determines optimal location parameters such as optimal R, Φ, hUAV. The optimal parameters are the parameters which increase the overall average data-rate of all the terrestrial user. The average data-rate may be determined using equation 1. In certain embodiments, optimal R, Φ may be determined using following method:

---
1: Initialize= $\phi$ = 30°, iter = 1000, count = 1, tol = 0.1
2: while count<=iter do
3:  Find: R* that maximizes avg. sum-rate (SR) by solving $\frac{\partial(SR)}{\partial R} = 0$ using binary search denoted as $S_{max}$ for $\phi$ 4:  Store: $S_1 = S_{max}$ at R*

5:  Find: $\theta^*$ that maximizes SR by solving $\frac{\partial(SR)}{\partial \phi} = 0$ using binary search denoted as $S_{max}$ for R = R*
6:  Store: $S_2 = S_{max}$ obtained from base station feedback
7:  $\phi = \phi^*$
8:  if abs($S_2 - S_1$) <= tol then
9:   $\phi^*$, R*,
10:   return
11:  else
12:   count = count+1
13:  end if
14: end while

---

In certain embodiments, optimal $h_{UAV}$ may be determined using following method:

---
1: Initialize= $h_{UAV}$ = 50, iter = 1000, count = 1, tol = 0.1
2: while count<=iter do
3:  Run: Algorithm-1 to find R* and $\phi^*$ for given $h_{UAV}$
4:  Store: $S_1 = S_{max}$ at R* and $\phi^*$,
5:  Find: $h_{UAV}^*$ that maximizes avg. sum-rate (ER) by solving $\frac{\partial(SR)}{\partial h_{UAV}} = 0$ using binary search denoted as $S_{max}$ for R* and $\theta^*$
6:  Set $h_{UAV} = h_{UAV}^*$
7:  Store: $S_2 = S_{max}$ at R*
8:  if abs($S_2 - S_1$) <= tol then
9:   $h_{UAV}^*$, $\theta^*$, R*,
10:   return
11:  else
12:   count = count+1
13:  end if
14: end while

---

Thereafter, at step 507, the method 500 may comprise transmitting, transceiver 610, the plurality of location parameters to the UAV. The UAV then may be relocated to the transmitted location.

In certain embodiments, the location of UAV may be determined performed in following steps using following signaling:

Step 1. The network entity/UAV requests for location coordinates of the UEs through Request for Location Control Message #ROL through unicast,/multicast/broadcast Step 2. The UEs reports their Cartesian coordinates to the network entity as a response to #ROL message through SRS signaling
or
If UAV receives the response to #ROL, it transmits to the network entity Step 3. The network entity estimates the optimal UAV 3D location based on method 500

Step 4. Terr-BS estimates the optimal UAV 3D location based on method 500/combination of method 100 and method 500

Step 5. The network entity requests UAV to halt/interrupt ongoing data access to the UEs through Request to halt service (#RHS) and switch to receive only mode Step 6. The UAV forms unicast link with network entity in response to #RHS and the network entity transmits transmit optimal location parameter (#OLP) which network entity determines based on method 500

Step 7. The UEs reports their updated data rate to the UAV, their current data rate either to the network entity or UAV through SRS messages Thus, the present disclosure provides efficient computation optimal location of the UAV periodically.

While specific language has been used to describe the disclosure, any limitations arising on account of the same are not intended. As would be apparent to a person in the art, various working modifications may be made to the method in order to implement the disclosure concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method to determine location for an unmanned aerial vehicle (UAV) serving a plurality of terrestrial user equipment (UEs), the method comprising:
    receiving information from a network entity, the information indicating that the plurality of terrestrial UEs form a cluster;
    determining whether at least one of a plurality of predefined events is triggered; and
    determining the location of the UAV, in case that the plurality of terrestrial UEs form the cluster and the at least one of the plurality of predefined events is triggered, wherein determining the location comprises:
        receiving cluster information related to the cluster;
        determining circular trajectory of the cluster using the cluster information;
        receiving a first average data rate of the cluster at each of a plurality of locations along a circumference of the circular trajectory;
        determining an optimal down-tilt angle and an optimal bearing angle of an antenna panel of the UAV based on the first average data rate at each of the plurality of locations; and
        determining the location of the UAV based on the optimal down-tilt angle and the optimal bearing angle.

2. The method of claim 1, wherein determining the optimal down-tilt angle and the optimal bearing angle of the antenna panel of the UAV comprises:
    receiving an average data rate at each of the plurality of locations corresponding to each of a plurality of down-tilt angles and each of a plurality of bearing angles; and
    determining the optimal down-tilt angle and the optimal bearing angle from the plurality of down-tilt angles and bearing angles, at which the average data rate is equal to or greater than the first average data rate.

3. The method of claim 1, further comprises relocating the UAV to the determined location.

4. The method of claim 1, wherein the plurality of predefined events include:
    a reduction in average data-rate of the plurality of terrestrial UEs,
    a reduction in packet error rate of the plurality of terrestrial UEs,
    an increase in average outage probability,
    a change in number of the plurality of terrestrial UEs,
    a change in data traffic requirement of the plurality of terrestrial UEs,
    a change in interference level,
    a change of command and control link parameters or UAV power status,
    a change in parameters of the UAV,
    a change in line-of-sight or non-line-of-sight-probabilities of the UAV, and
    a change of the command and control link parameters.

5. The method of claim 1, wherein receiving the cluster information comprises:
    receiving the cluster information from the network entity, the cluster information being based on at least one of channel state information (CSI), beam parameters of the plurality of terrestrial UEs, interference experienced by the plurality of terrestrial UEs, and minimum packet error rate (PER) threshold data traffic requirement of the plurality of terrestrial UEs.

6. The method of claim 1, wherein the cluster information includes a centroid of a circle of the cluster and a radius of the circle.

7. The method of claim 1, further comprises:
    determining whether at least one of a plurality of key performance indicators of the plurality of terrestrial UEs is below a predetermined threshold; and
    requesting the network entity to modify a plurality of parameters of the UAV in case that the at least one of the plurality of key performance indicators of the plurality of terrestrial UEs is below the predetermined threshold.

8. A method to determine location for an unmanned aerial vehicle (UAV) serving a plurality of terrestrial user equipment (UEs), the method comprising:
    determining, based on pathloss data for the plurality of terrestrial UEs, that the plurality of terrestrial UEs are uniformly distributed in a cell;
    receiving location coordinates of the plurality of terrestrial UEs;
    determining a plurality of location parameters of the UAV using the location coordinates of the plurality of terrestrial UEs, wherein the plurality of location parameters includes at least one of a 2-D ground distance of the UAV, a 2-D polar angle the UAV makes relative to a positive x-axis passing through a center of the cell, and a height of the UAV; and
    transmitting the plurality of location parameters to the UAV.

9. An apparatus to determine location for an unmanned aerial vehicle (UAV) serving a plurality of terrestrial user equipment (UEs), the apparatus comprising:
- a transceiver;
- one or more processors including processing circuitry; and
- memory storing instructions that, when executed by the one or more processors individually or collectively, cause the apparatus to:
  - receive, via the transceiver, information from a network entity, the information indicating that the plurality of terrestrial UEs form a cluster;
  - determine whether at least one of a plurality of predefined events is triggered; and
  - determine the location of the UAV, in case that the plurality of terrestrial UEs form the cluster and the at least one of the plurality of predefined events is triggered, wherein determining the location comprises:
    - receiving cluster information related to the cluster;
    - determining circular trajectory of the cluster using the cluster information;
    - receiving a first average data rate of the cluster at a plurality of locations along the circular trajectory;
    - determining an optimal down-tilt angle and an optimal bearing angle of an antenna panel of the UAV at the plurality of locations; and
    - determining the location of the UAV based on the optimal down-tilt angle and the optimal bearing angle.

10. The apparatus of claim 9, wherein the instructions, when executed by the one or more processors individually or collectively, cause the apparatus to:
- receive, via the transceiver, an average data rate at each of the plurality of locations corresponding to each of a plurality of down-tilt angles and each of a plurality of bearing angles; and
- determine the optimal down-tilt angle and the optimal bearing angle from the plurality of down-tilt angles and bearing angles, at which the average data rate is equal to or greater than the first average data rate.

11. The apparatus of claim 9, wherein the instructions, when executed by the one or more processors individually or collectively, cause the apparatus to relocate the UAV to the determined location.

12. The apparatus of claim 9, wherein the plurality of predefined events include:
- a reduction in average data-rate of the plurality of terrestrial UEs,
- a reduction in packet error rate of the plurality of terrestrial UEs,
- an increase in average outage probability,
- a change in number of the plurality of terrestrial UEs,
- a change in data traffic requirement of the plurality of terrestrial UEs,
- a change in interference level,
- a change of command and control link parameters or UAV power status,
- a change in parameters of the UAV,
- a change in line-of-sight or non-line-of-sight-probabilities of the UAV, and
- a change of the command and control link parameters.

13. The apparatus of claim 9, wherein the instructions, when executed by the one or more processors individually or collectively, cause the apparatus to receive, via the transceiver, at least one of:
- the cluster information from the network entity;
- the cluster information from the plurality of terrestrial UEs; and
- the cluster information from the network entity, wherein the network entity determines the cluster information based on at least one of a channel state information (CSI), beam parameters of the plurality of terrestrial UEs, interference experienced by the plurality of terrestrial UEs, and minimum packet error rate (PER) threshold data traffic requirement of the plurality of terrestrial UEs.

14. The apparatus of claim 9, wherein the cluster information includes a centroid of a circle of the cluster and a radius of the circle.

15. The apparatus of claim 9, wherein the instructions, when executed by the one or more processors individually or collectively, cause the apparatus to:
- determine whether at least one of a plurality of key performance indicators of the plurality of terrestrial UEs is below a predetermined threshold; and
- request the network entity to modify a plurality of parameters of the UAV in case that the at least one of the plurality of key performance indicators of the plurality of terrestrial UEs is below the predetermined threshold.

16. An apparatus to determine location for an unmanned aerial vehicle (UAV) serving a plurality of terrestrial user equipment (UEs), the apparatus comprising:
- a transceiver;
- one or more processors including processing circuitry; and
- memory storing instructions that, when executed by the one or more processors individually or collectively, cause the apparatus to:
  - determine, based on pathloss data for the plurality of terrestrial UEs, that the plurality of terrestrial UEs are uniformly distributed in a cell;
  - receive location coordinates of the plurality of terrestrial UEs;
  - determine a plurality of location parameters of the UAV using the location coordinates of the plurality of terrestrial UEs, wherein the plurality of location parameters includes at least one of a 2-D ground distance of the UAV, a 2-D polar angle the UAV makes relative to a positive x-axis passing through a center of the cell and a height of the UAV; and
  - transmit the plurality of location parameters to the UAV.

* * * * *